Oct. 12, 1954 W. BORBERG 2,691,320
MOTION PICTURE PROJECTOR, INCLUDING MODULATED
AIR JET MEANS FOR REDUCING FILM BUCKLES
Filed May 16, 1950 2 Sheets-Sheet 1
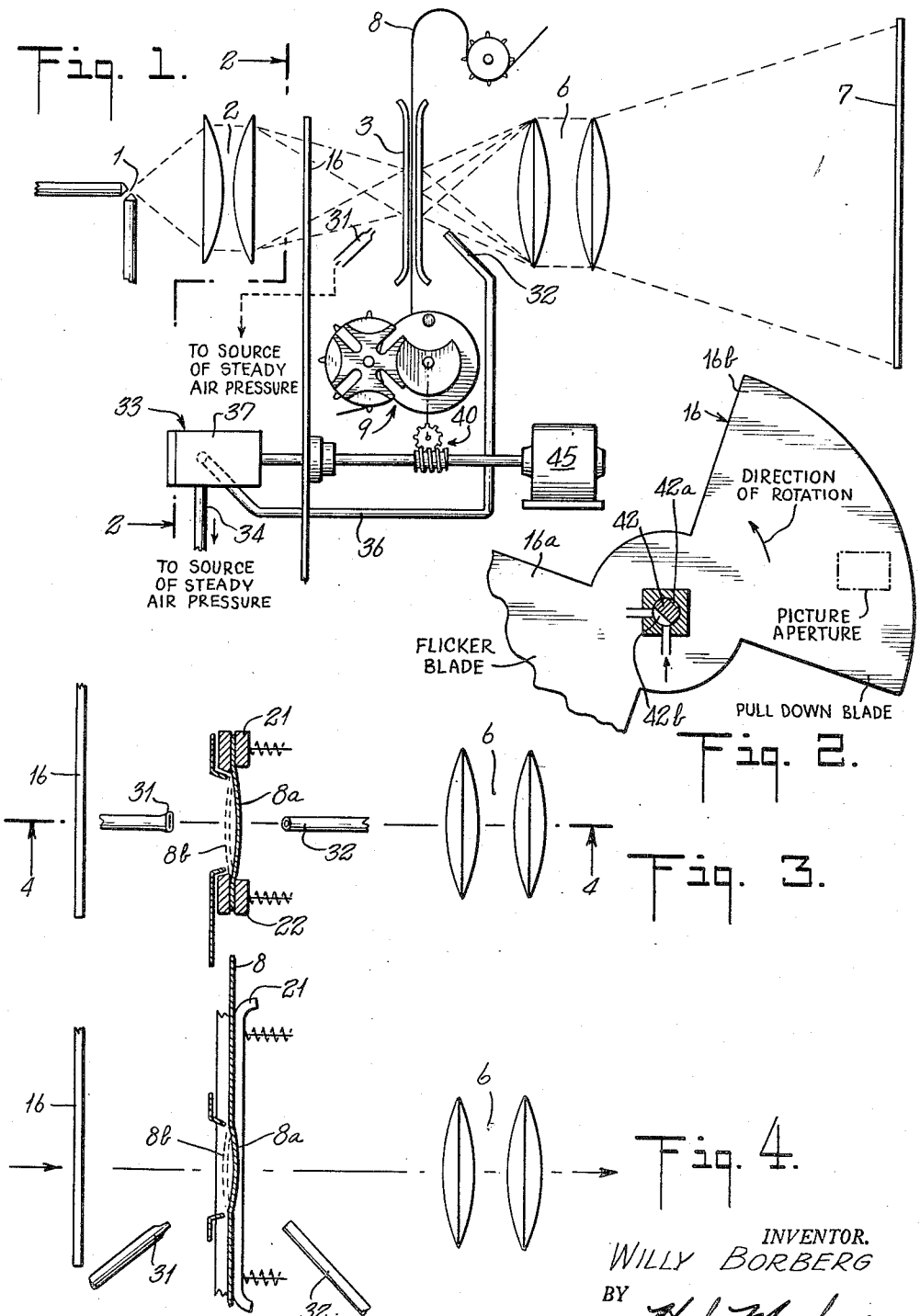
INVENTOR.
WILLY BORBERG
BY
ATTORNEY Oct. 12, 1954

W. BORBERG 2,691,320

MOTION PICTURE PROJECTOR, INCLUDING MODULATED
AIR JET MEANS FOR REDUCING FILM BUCKLES

Filed May 16, 1950

INVENTOR.
WILLY BORBERG
BY
ATTORNEY

Patented Oct. 12, 1954

2,691,320

UNITED STATES PATENT OFFICE 2,691,320

MOTION PICTURE PROJECTOR, INCLUDING MODULATED AIR JET MEANS FOR REDUCING FILM BUCKLES

Willy Borberg, Astoria, N. Y., assignor to General Precision Laboratory Incorporated, a corporation of New York Application May 16, 1950, Serial No. 162,320

8 Claims. (Cl. 88—18)

This invention relates to an improvement in the art of motion picture projection and is particularly directed to the elimination of problems encountered in motion picture projectors using high intensity illumination.

Extensive efforts have been made over a period of years in development of the motion picture art to increase the intensity of illumination and the degree of definition. The solution of these problems has involved considerable compromise because, generally speaking, the solution of one problem is the antithesis of another.

The advent of the high intensity light source in motion picture projectors, such as those used in the very large indoor and outdoor theatres, has presented a new problem which adversely affects the focusing of the picture on the screen and makes it difficult to maintain all portions of the picture in focus during the exposure of each frame. This is caused by the buckling of the film due to the radiation emanating from the light source absorbed by the film emulsion. In addition to the direct heat from the light source, the film is also subjected to other radiation which is converted to heat when absorbed by the film.

Usually in the large projectors the motion picture film is conventionally threaded through the projector so that the emulsion side of the film is toward the source of illumination. Because the emulsion has a temperature coefficient of expansion different from that of the base of the film, when the film is exposed to a light source the accompanying heat causes the emulsion to expand more than the base thereby producing a bulge in the portion of the film which is immediately in front of the light source. This bulging action of the film is very similar to that encountered in the operation of a bimetallic thermostatic element. Because the emulsion side is toward the light source and because its coefficient of expansion is greater than that of the base part of the film, the heat from the light source causes the film to bulge toward the light source. This bulge is commonly referred to in the art as negative while the bulge in the opposite direction, towards the projection lens or the screen, is referred to as positive. The sucessive picture frames of the film normally have a positive bulge, the significance of which will be more apparent from subsequent description. This normal positive bulge is due to the fact that when the emulsion is placed on the base it shrinks slightly during its setting and drying phase and this produces stresses which cause the film to bulge in the positive direction.

In order to reduce the flicker in motion pictures, at the rates of projection ordinarily used, the conventional motion picture projector has a two-blade shutter which rotates at such a speed that each picture frame of the film is subjected to two successive light exposures. Accordingly, each picture frame will be subjected to the heat of the light source at two successive time intervals. When the heat from the light source strikes the film during the first exposure interval the film will be heated and will begin immediately to warp from its normal positive position toward the opposite direction. During the succeeding time interval when one of the shutter blades is interposed between the light source and the film, the shutter blade cuts off the heat and the film begins to cool and to recede to a slightly less negative position. Then during the second interval of exposure the heat from the light source again strikes the film causing it to develop a deeper negative buckle. The effect of this is to cause each picture frame as it is presented in the film gate and projected on to the screen to oscillate or fluctuate in position along the optical axis of the projector in time phase with the exposure of the film to the light source. It will be readily apparent that because the film bulges the center part of the film will be displaced more than the other points of each film frame and accordingly, the different points on the film frame area will move toward and away from the projection lens causing a blurred image on the screen, thereby producing a displeasing effect to the observer.

A true magnified replica of a photographic film image can be projected on a screen only if each successive frame remains fixed in the focal plane of the projection lens during the exposure periods. Heretofore numerous suggestions have been made for maintaining the frames in a fixed plane such as by means of transparent guiding plates but such devices have the obvious disadvantage of causing deterioration and wear of the film. Also it has heretofore been proposed to provide a cooling air jet against the sides of the film to cool the film and thereby attempt to overcome the bulging caused by the heat from the lamp source. The continuous air jets do not solve the problem because it is substantially impossible to dissipate the heat fast enough to prevent the intermittent bulging of the film during the intermittent exposures. The inventive concept of the present invention contemplates the provision of air jets directed against the opposite sides of the film with the velocity of one or both of the air jets being modulated to control the position of the mechanically free portion of the picture frames within desired limits. The objectives of the present invention can be accomplished by maintaining a constant jet of air against one side and providing a modulated jet against the other side, the important thing being that the net effect of the forces created by the jets against the opposite sides of the film will be such as to substantially offset the tendency of the film to buckle under the action of the heat from the light source.

Accordingly, the primary object of the invention is to provide an improved method and apparatus in which the warping of the film due to the heat from the light source is minimized.

Another object is to provide an improved motion picture projector apparatus in which the movement of the film with respect to the best average focus under the influence of the intermittent exposure will be kept to a minimum.

Another object is to provide an improved motion picture apparatus in which the ratio of the "in-focus" to the "out-of-focus" of each picture frame is kept at a minimum.

A still further object is to provide motion picture apparatus in which the bulging of the picture frames during exposure to the light source are minimized so that a maximum portion of each frame is maintained within the focus range of the projection lens.

Other and further objects will become apparent from the following description when considered with the accompanying drawings in which:

Figure 1 is a schematic representation of the essential elements of a motion picture projector embodying the present invention.

Figure 2 is a partial sectional elevation view taken on line 2—2 of Fig. 1, showing the relation of the shutter blade, and the rotary valve for controlling the air jet.

Figure 3 is a plan sectional view illustrating the components illustrated in Fig. 1.

Figure 4 is a vertical sectional view on line 4—4 of Fig. 3.

Figure 5:
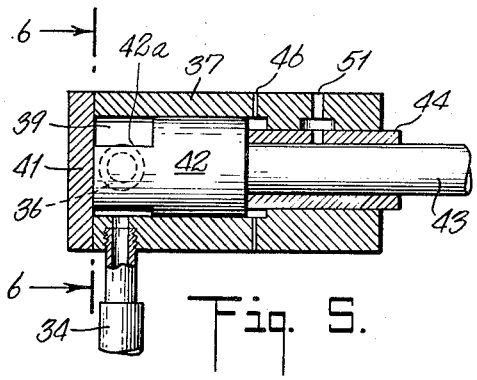
Figure 5 is a cross-sectional view of apparatus for modulating the air jets in accordance with the present invention.

The essential elements of a conventional motion picture projector to which the present invention may be adapted is shown in Fig. 1 where the light source is represented by high intensity arc lamp carbons 1. A suitable lens system 2 is adapted to concentrate the light from the arc lamp 1 on the aperture plate 3 of the film gate. Suitable projection lens system 6 is provided for forming a picture image on the screen 7. In accordance with conventional practice the lens system 6 is adjustable along the optical axis thereof with respect to the aperture plate 3 of the film gate for the purpose of focusing the picture on the screen 7. The motion picture film 8 is fed across the aperture in the aperture plate 3 by means of suitable intermittent film feeding mechanism 9 of conventional construction. A suitable shutter 16, having diametrically opposite blades 16a and 16b, is driven in synchronism with the mechanism for intermittently moving the film. The ratio of the gearing between the film feeding mechanism 9 and the shutter 16 is such that each picture frame of the film is exposed twice. In other words, the light from the arc lamp 1 is interrupted by one of the blades 16a, usually referred to as the pull down blade, during the time that the film moves to bring a picture frame in front of the aperture in the aperture plate 3; the light is again interrupted when the "flicker" blade 16b passes between the light source and the film. The film gate is provided with the usual pressure shoes 21 and 22 which together with the aperture plate 3 guide the lateral edges of the film 8 across the aperture in the aperture plate 3 and also provide the necessary friction to maintain the film in a taut condition. The pressure shoes 21 and 22 are spring biased in accordance with conventional practice.

As has been previously mentioned the film 8 has a normally positive bulge which is inherent because during processing the emulsion shrinks slightly more than the base of the film. This positive bulge is indicated in the solid line position 8a in Fig. 3; the dotted line position 8b indicating the negative bulge which is normally produced when the stationary picture frame is exposed to the light and heat rays from the arc lamp 1. It is to be understood that in addition to the direct heat rays which strike the film, the latter is also subjected to other radiation which is absorbed by the film emulsion and transformed into heat.

In the form of the invention shown for the purpose of illustration, an air nozzle 31 which is preferably connected to a constant source of air pressure is positioned so that the jet strikes the emulsion side of the portion of the film which is opposite the aperture plate 3 and facing the light source while a second air nozzle 32 which is adapted to deliver a modulated air jet to the opposite side of the film.

Figure 6:
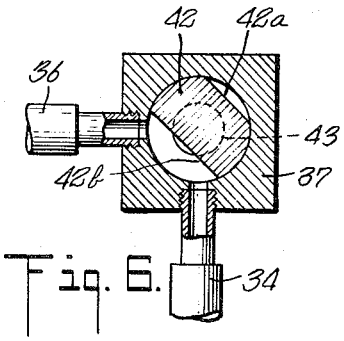
Figure 6 is a sectional view on line 6—6 of Fig. 5.

Means in the form of a rotary valve mechanism 33 is provided for modulating the air supplied to the nozzle 32. The valve mechanism 33 is provided with an inlet connection 34, adapted to be connected to any suitable source of air pressure and an outlet conduit 36 which is adapted to be connected to the air jet nozzle 32. The rotary valve mechanism 33 comprises a suitable casing 37 provided with a cylindrical bore 39. The bore 39 is closed by a suitable end plate 41. A suitable cylindrical valve rotor 42 is adapted to rotate in the bore 39. This rotor is mounted on a suitable shaft 43 which is driven in synchronism with the shutter 16. In the embodiment illustrated, the valve rotor 42 is directly connected to the gearing 40 which operates the intermittent film feeding mechanism 9 to insure proper synchronization between the modulated air jet pulses and the picture frames. The gearing 40 is continuously driven by a suitable motor 45. The valve rotor 42 is provided with recesses 42a and 42b which, as is clearly shown in Fig. 6, provide communication between the inlet conduit 34 and the outlet conduit 36 during predetermined positions of the valve rotor 42. It is to be particularly noted that the recess 42a is of different size than the recess 42b. The primary purpose of this construction is to provide a difference in the throttling effect and therefore produce a variation in the magnitude of the air jet supplied to the film 8 through the air jet nozzle 32. The external forces acting on the film 8 are due to the respective kinetic pressures developed by the air jets and therefore any change in their velocities result in substantial instantaneous changes in the respective kinetic pressures.

It is not essential that the portion of the valve rotor 42 between the recesses 42a and 42b have a sealing engagement with the bore 39 because it is only necessary to modulate or vary the flow of the air to nozzle 32 rather than to intermittently completely shut off the air flow. In order to prevent the air pressure from forcing the lubricant out of the bearing sleeve 44 in which the shaft 43 rotates, a suitable air bypass 46 is provided. The bearing sleeve 44 extends a distance into the bore 39 to prevent the inner face of the valve rotor 42 from engaging the inner end of the bore thereby providing an annular recess into which any air which escapes between the outer surface of the valve rotor 42 and the inner surface of the bore 39 may pass. The bleeding passage 46 permits the air pressure behind the valve rotor 42 to escape and thereby prevent it from pushing the lubricant out of the bearing sleeve 44. The bearing 44 may be lubricated through the oil hole 51.

Figure 7:
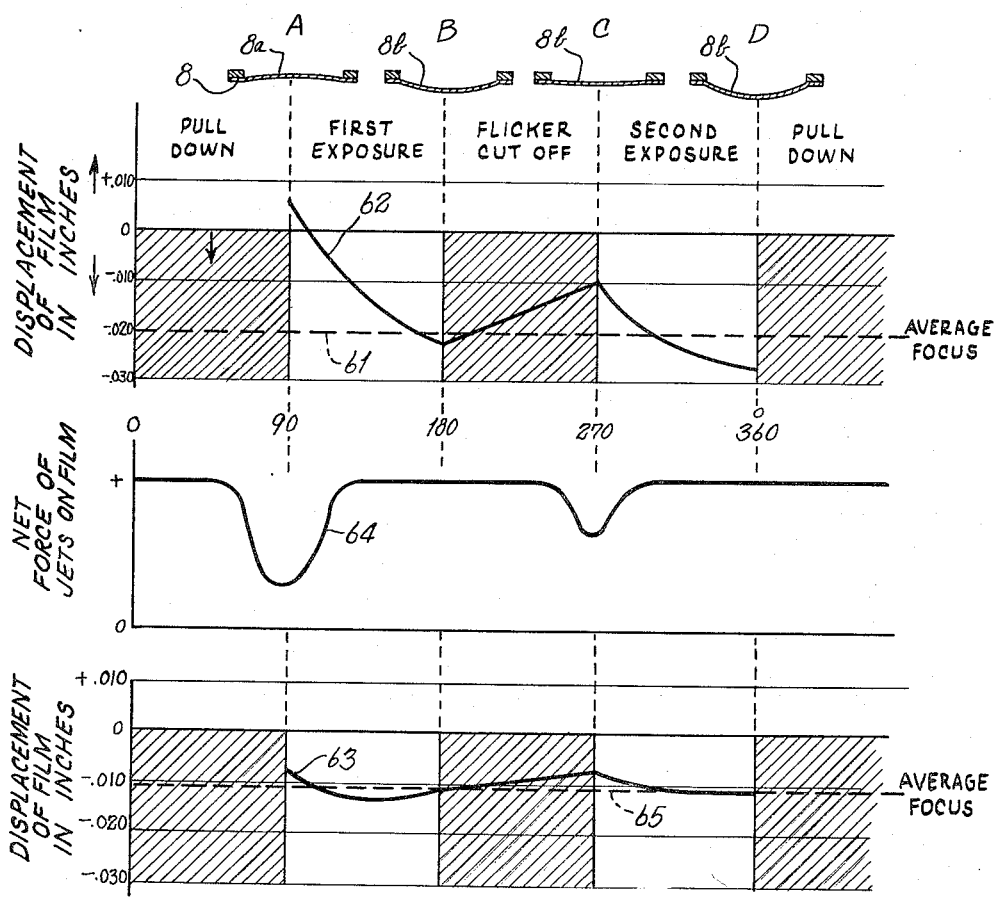
Figure 7 is a graphical comparison of the movement of the centers of the picture frames during the exposure periods.

The graphs of Fig. 7 present a vivid comparison between the movement of the center of the picture frames under the intermittent exposure both with and without the modulated air jet to oppose movement due to alternate heating and cooling of the film. The upper graph shows the movement of the film without the modulated air jet while the lower graph illustrates the effect of the modulated jet.

In the upper graph of Fig. 7 the horizontal line designated by zero represents the plane of the front of the film gate that is, the ideal position for the focal plane of the lens system 6 if the film 8 remained flat. The positive and negative ordinates represent the distances from this zero position, the positive values representing positions between this zero position and the lens system 6 and the negative values representing positions on the other side of the zero position. As has been previously mentioned the motion picture film 8 has a normally positive buckle as indicated in Figs. 3 and 4, when it arrives at the aperture plate 3 in the film gate and before the shutter 16 has moved to such a position as to expose the picture frame to the light from the arc lamp 1. The abscissae in Fig. 7 in all instances represent the time axis. The dotted line 61 in the upper graph represents the "best average focus," or, in other words, the position of the lens system 6 which gives the best average picture over the greatest part of the exposure periods, when the present invention is not used.

From this graph it will be very apparent that as one of the shutter blades of the shutter 16 moves so as to permit light from the arc lamp 1 to strike the picture frame the latter will become heated and the unequal expansion of the emulsion and the base will cause the film to buckle toward the negative position at B, and the center of the film will move from the positive to the negative side of the zero line during the first exposure. Then, when the flicker blade 16a comes between the arc lamp 1 and the film 8 the latter begins to cool and recedes toward the normal positive buckle condition. Subsequently, when the shutter blade again uncovers the light rays the film 8 is again heated and further negative buckle develops, on this second exposure the negative buckle reaches a value below the horizontal dotted line. It is to be understood of course, that at the end of the second exposure the film 8 is advanced one picture frame.

From Fig. 2 it will be seen that each of the shutter blades extends over an arc which substantially corresponds to the cross hatched areas of the graphs of Fig. 7. The primary purpose of the invention is to reduce the fluctuating movement of the picture frames of the film 8 during the two successive light exposures of each frame. It will therefore be readily apparent that the net forces acting on the sides of the film 8 could be varied by the pulsed air jet so as to maintain the exposed film frame in a relatively fixed position with respect to the projection lens.

From the upper graph of Fig. 7 showing conditions when no air jets are used it will be seen that the fluctuating movements of the center of the film indicated by the solid line 62 extends over a very wide range and accordingly it is difficult to adjust the lens system 6 to obtain the "best average focus." Also because of these wide fluctuating movements it will be readily apparent that for the best focusing position selected for the lens system 6 there will be large portions of the exposure periods when the picture is considerably out of focus.

Since the picture frames of the film have a normally positive buckle as indicated at position A in Fig. 7 and the heat from the arc lamp 1 will normally cause the film to buckle towards the negative position, the movement toward the negative buckle position can be neutralized or reduced by varying the balance between the forces of the air jets on the opposite sides of the film. Since the air jet from the nozzle 31 is constant and tends to slightly increase the positive buckle, the tendency of the heat from the light source to make the film buckle in a negative position can be neutralized or reduced by reducing the velocity of the air jet from the nozzle 32 as the film 8 begins to warm up. An analysis of Fig. 7 will clearly indicate that the film 8 needs a momentary negative push at the point A of Fig. 7 and again at the point C which is at the beginning of the second exposure and after the flicker blade 16a has given the film an opportunity to cool off slightly.

This is accomplished in the specific embodiment illustrated by having the velocity of the air jet from the nozzle 32 at a maximum at the point A, that is, just at the end of the pull down movement of the film when the new picture frame is still cool. At this instant the air jet from the nozzle 32 prevents the steady air jet from nozzle 31 from producing excessive positive bulge in the film 8. The mechanical relation between the pull down blade 16b and the rotary valve 42 corresponding to this condition is clearly shown in Fig. 2. From the latter figure it is seen that when the trailing one-third of the pull down blade 16b remains to pass in front of the picture aperture in the film gate the recess 42b of the rotary valve 42 is in such a position as to give the maximum air flow between the inlet conduit 34 and outlet conduit 36 which supplies the air to the nozzle 32. Accordingly, as the trailing edge of the pull down blade 16b passes the film gate the rotary valve 42 will move to such a position as to gradually reduce the velocity of the jet from the nozzle 32 and eventually substantially cut it off at a point approximately halfway between A and B of Fig. 7. At this point the film will have moved from the positive buckle position shown at point A to a slightly negative buckle at point B, the actual movement of the center of the film frame being indicated by the solid line 63. At the position B the valve rotor 42 will have moved so that no air passes through.

As the shutter 16 continues to rotate and the flicker blade 16a passes in front of the picture aperture, thus cutting off the light from the film 8, the latter will begin to cool and under the combined action of the inherent stress in the film and the action of the air jet from the nozzle 31 will move toward the positive-buckle position of the film as indicated at point C. However, just before the trailing edge of the flicker blade 16a approaches the picture aperture of the film gate the smaller recess 42a will provide communication between inlet conduit 34 and the outlet conduit 36. Then again as the shutter continues to rotate the air jet from the nozzle 32 will be gradually diminished as the film 8 begins to heat up and buckle under the action of the heat from the arc lamp 1 in opposition to the force of the steady air jet from the nozzle 31 until the end of the second exposure period at the point D, lower graph of Fig. 7, where the pull down blade 16b again passes in front of the picture aperture thereby cutting off the light, after which the cycle is repeated with a new picture frame.

From the foregoing and with particular reference to Fig. 7 it will be readily apparent that the individual picture frames of the motion picture film 8 fluctuates back and forth during the two intermittent exposure periods due to the alternate heating and cooling of the film, and this fluctuating movement can be reduced by varying the net forces of the opposing air jets from nozzles 31 and 32 by varying either one or both of the air jets in synchronism with, but in the proper directions to oppose, the forces tending to move the film as the result of the alternate heating and cooling of the film 8. This net opposing air jet force is indicated qualitatively by the solid line curve 64 in Fig. 7. The advantage of the modulated air jet from nozzle 32 is clearly apparent from the lower graph where it will be seen that the curve 64 indicates that the film 8 remains within very close range of the best average focus position of the projection lens indicated by the dotted line 65.

It will be readily understood that the specific embodiment of the invention described above constitutes only one of numerous variations within the scope of the present inventive concept. For example, if desired, the air pressure to the nozzle 31 could be modulated in such a manner as to substantially overcome the forces tending to produce a negative buckle in the film 8 and, accordingly, it is to be understood that it would then be necessary to move the lens system 6 to change the relative zero position. In other words, the air jets from the nozzles 31 and 32 may be relatively modulated in the proper timed relation so that the net effect would overcome the tendency of the film to buckle and hold the film in a substantially fixed plane. Alternately, the relative modulation of the air jets could be such as to hold the film at all times during exposure in a slightly negative buckled position. In projectors in which the film is threaded with the emulsion side away from the light source, the air jets could be varied accordingly to produce a relatively flat film plane. Although the present invention has been disclosed as being applied to a motion picture projector it is to be understood that the invention could also be applied to projectors for still pictures, in which case the fluid pressure of the jets against the sides of the film would be varied to oppose the warping movement of the film caused by the heat of the light source.

It is to be noted that the above description refers to a specific conventional motion picture apparatus in which there are two or more exposures per picture frame. However, it is to be understood that the invention is also applicable to motion picture projectors in which each frame is exposed only once. In this event, the pulse timing and pulse duration of the modulated air jet would be varied accordingly to maintain the picture frame in a flat plane.

Also it is to be noted that the objects of the present invention could be accomplished by the use of a single modulated jet. This would be preferably located and directed against the emulsion side of the film and would be modulated to oppose the buckling of the film due to the expansion of the emulsion, caused by the exposure to the light source.

From the foregoing description it will be readily apparent that the present invention has provided an improved motion picture apparatus which greatly reduces the adverse effects of the heat of the light source on the proper focusing on the film during the exposure periods of the picture frames. It will also be readily apparent that the exact details of the means and method by which the modulated air jet, or air jets, are applied to the opposite sides of the film are not important so long as the air pressure is applied in such a manner as to maintain the position of the film within the limited range over which the projecting lens can properly focus all points of the picture on the screen. It will be understood from the above specific description that the correcting action on the film is the result of modulated differential pressure on the opposite sides of the film and that therefore the same effect could be accomplished by using a modulated partial vacuum on one side of the film.

What is claimed is:

1. In a motion picture projector, a laminated film strip including a base layer and a picture-bearing emulsion layer, said layers having a tendency to expand at different rates and by different amounts when exposed to a light source which will inherently heat said film strip and cause localized buckling, a light source, an optical system for projecting images from the film frames of said film strip, a film gate having a physically unobstructed aperture in alignment with said light source and the axis of said optical system, said gate also having guiding means for engaging and maintaining in a fixed plane substantially at the focus of said optical system the lateral edges of the portion of the film strip lying over said aperture, means for intermittently stepping said film strip through said gate to expose successive film frames over said aperture while said film is stationary, means for intermittently interrupting the exposure of a stationary film frame in said aperture to said light source, means for reducing the small deviations of the physically unsupported portion of the film strip lying over said aperture from the plane in which the edges of the film strip are held by said edge guiding means including means for directing a jet of air against the respective sides of the stationary film frame in said aperture and valve means operated synchronously with said light-interrupting means for varying the pressure of one of said jets at a rate correlated with the rate of heat absorption by the film causing the buckling during the exposure intervals so that the resultant pressure force on said stationary film frame in said aperture created by said air jets synchronously opposes and substantially neutralizes the buckling force due to the inequal change in expansion of the layers of said film strip due to the different heat absorption rates in a manner to minimize deviations of the central portion of the exposed film frame from the plane of the lateral edges of the film frame.

2. In a motion picture projector, a laminated film strip including a base layer and picture-bearing emulsion layer, said layers having a tendency to expand at different rates and by different amounts when exposed to a light source which will inherently heat said film strip and cause localized buckling, a light source, an optical system for projecting images from the film frames of said film strip, a film gate having a physically unobstructed aperture in alignment with said source and the axis of said optical system, said gate also having guiding means for engaging and maintaining in a fixed plane substantially at the focus of said optical system the lateral portions of the film strip lying over said aperture, means for intermittently stepping said film strip through said gate to expose successive film frames over said aperture while said film strip is stationary, means for intermittently interrupting the exposure of a stationary film frame in said aperture to said light source, means for reducing the small deviations of the physically unsupported position of the film strip lying over said aperture from the plane in which the edges of the film strip are held by said edge guiding means including means for directing a jet of air against the respective sides of the stationary film frame laying over said aperture, the jet against the layer having the higher coefficient of expansion being steady, the jet against the other side being variable, and valve means operated synchronously with said light interrupting means for varying the pressure of the jet against the other side of said film strip at a rate correlated with the rate of heat absorption by the film causing the buckling during the exposure intervals so that the resultant pressure force on said film frame in said aperture created by said air jets synchronously opposes and substantially neutralizes the buckling force due to the unequal change in expansion of the layers of said film strip due to the different heat absorption rates in the manner to minimize deviations of the central portion of the exposed film frame from the plane of the lateral edges of the film frame.

3. In a motion picture projector, a laminated film strip including a base layer and picture-bearing emulsion layer, said layers having a tendency to expand at different rates and by different amounts when exposed to a light source which will inherently heat said film strip and cause localized buckling, a light source, an optical system for projecting images from the film frames of said film strip, a film gate having a physically unobstructed aperture in alignment with said source and the axis of said optical system, said gate also having guiding means for engaging and maintaining in a fixed plane substantially at the focus of said optical system the lateral portions of the film strip lying over said aperture, means for intermittently stepping said film strip through said gate to expose successive film frames over said aperture while said film strip is stationary, means for intermittently interrupting the exposure of a stationary film frame in said aperture to said light source, means for reducing the small deviations of the physically unsupported position of the film strip lying over said aperture from the plane in which the edges of the film strip are held by said edge guiding means including means for directing a jet of air against the respective sides of the stationary film frame laying over said aperture, the jet against the side facing said light source being steady, the jet against the other side being variable, and valve means operated synchronously with said light interrupting means for varying the pressure of the jet against the other side of said film strip at a rate correlated with the rate of heat absorption by the film causing the buckling during the exposure intervals so that the resultant pressure force on said film frame in said aperture created by said air jets synchronously opposes and substantially neutralizes the buckling force due to the unequal change in expansion of the layers of said film strip due to the different heat absorption rates in the manner to minimize deviations of the central portion of the exposed film frame from the plane of the lateral edges of the film frame.

4. In a motion picture projector, a laminated film strip including a base layer and picture-bearing emulsion layer, said layers having a tendency to expand at different rates and by different amounts when exposed to a light source which will inherently heat said film strip and cause localized buckling, a light source, an optical system for projecting images from the film frames of said film strip, a film gate having a physically unobstructed aperture in alignment with said source and the axis of said optical system, said gate also having guiding means for engaging and maintaining in a fixed plane substantially at the focus of said optical system the lateral portions of the film strip lying over said aperture, means for intermittently stepping said film strip through said gate to expose successive film frames over said aperture while said film strip is stationary, means operatively connected with said intermittent film stepping means for exposing each film frame twice in immediate succession while laying stationary over said aperture, means for reducing the small deviations of the physically unsupported portion of the film strip lying over said aperture from the plane in which the edges of the film strip are held by said edge guiding means including means for directing a jet of air against the respective sides of the stationary film frame in said aperture and valve means operated synchronously with said light interrupting means for varying the pressure of the jet against one side of said film strip at a rate correlated with the rate of heat absorption by the film causing the buckling during the exposure intervals so that the resultant pressure force on said film frame in said aperture created by said air jets synchronously opposes and substantially neutralizes the buckling force due to the unequal change in expansion of the layers of said film strip due to the different heat absorption rates in a manner to minimize deviations of the central portion of the exposed film frame from the plane of the lateral edges of the film frame.

5. In a motion picture projector, a laminated film strip including a base layer and picture-bearing emulsion layer, said layers having a tendency to expand at different rates and by different amounts when exposed to a light source which will inherently heat said film strip and cause localized buckling, a light source, an optical system for projecting images from the film frames of said film strip, a film gate having a physically unobstructed aperture in alignment with said source and the axis of said optical system, said gate also having guiding means for engaging and maintaining in a fixed plane substantially at the focus of said optical system the lateral edges of the portion of the film strip laying over said aperture, means operatively connected with said intermittent film stepping means for exposing each film frame twice in immediate succession while laying stationary over said aperture, means for reducing the small deviations of the physically unsupported portion of the film strip laying over said aperture from the plane in which the edges of the film strip are held by said edge guiding means including means for directing a jet of air against the respective sides of said film frame laying stationary in said aperture, the jet directed against the layer having the higher coefficient of expansion being steady, the jet directed against the other side being variable, and valve means operated synchronously with said light interrupting means for varying the pressure of the jet against the said other side of said film strip at a rate correlated with the rate of heat absorption by the film causing the buckling during the exposure intervals so that the resultant pressure force on said film frame in said aperture created by said air jets synchronously opposes and substantially neutralizes the buckling force due to the unequal change in expansion of the layers of said film strip due to the different heat absorption rates in a manner to minimize deviations of the central portion of the exposed film frame from the plane of the lateral edges of the film frame.

6. In a motion picture projector, a laminated film strip including a base layer and picture-bearing emulsion layer, said layers having a tendency to expand at different rates and by different amounts when exposed to a light source which will inherently heat said film strip and cause localized buckling, a light source, an optical system for projecting images from the film frames of said film strip, a film gate having a physically unobstructed aperture in alignment with said source and the axis of said optical system, said gate also having guiding means for engaging and maintaining in a fixed plane substantially at the focus of said optical system the lateral edges of the portion of the film strip laying over said aperture, means for intermittently stepping said film strip through said gate to expose successive film frames over said aperture while said film strip is stationary, means operatively connected with said intermittent film stepping means for exposing each film frame to said light source twice in immediate succession while laying stationary over said aperture, means for reducing the small deviations of the physically unsupported portion of the film strip laying over said aperture from the plane in which the edges of the film strip are held by said edge guiding means including means for directing a jet of air against the respective sides of the stationary film frame in said aperture and valve means operated synchronously with said light interrupting means for varying the pressure of one of said jets by an amount greater during the first exposure than during the second exposure of each film frame at a rate correlated with the rate of heat absorption by the film causing the buckling during the exposure intervals so that the resultant pressure force on said film frame in said aperture created by said air jets synchronously opposes and substantially neutralizes the buckling force due to the unequal change in expansion of the layers of said film strip due to the different heat absorption rates in a manner to minimize deviations of the central portion of the exposed film frame from the plane of the lateral edges of the film frame.

7. In a motion picture projector, a laminated film strip including a base layer and picture-bearing emulsion layer, said layers having a tendency to expand at different rates and by different amounts when exposed to a light source which will inherently heat said film strip and cause localized buckling, a light source, an optical system for projecting images from the film frames of said film strip, a film gate having a physically unobstructed aperture in alignment with said source and the axis of said optical system, said gate also having guiding means for engaging and maintaining in a fixed plane substantially at the focus of said optical system the lateral edges of the portions of the film strip laying over said aperture, means for intermittently stepping said film strip through said gate to expose successive film frames over said aperture while said film strip is stationary, means operatively connected with said intermittent film stepping means for exposing each film frame twice in immediate succession while laying stationary over said aperture, means for reducing the small deviations of the physically unsupported portion of the film strip laying over said aperture from the plane in which the edges of the film strip are held by said edge guiding means including means for directing a jet of air against the respective sides of the stationary film frame over said aperture and valve means operated synchronously with said light interrupting means for varying the pressure of one of said jets at a rate correlated with the rate of heat absorption by the film causing the buckling during the exposure intervals so that the resultant pressure force against the layer of higher coefficient of expansion of said film frame in said aperture created by said air jets synchronously opposes and substantially neutralizes the buckling force due to the unequal change in the expansion of the layers of said film strip due to the different heat absorption rates in a manner to minimize deviations of the central portion of the exposed film frame from the plane of the lateral edges of the film frame.

8. In a motion picture projector, a laminated film strip including a base layer and picture-bearing emulsion layer, said layers having a tendency to expand at different rates and by different amounts when exposed to a light source which will inherently heat said film strip and cause localized buckling, a light source, an optical system for projecting images from the film frames of said film strip, a film gate having a physically unobstructed aperture in alignment with said source and the axis of said optical system, said gate also having guiding means for engaging and maintaining in a fixed plane substantially at the focus of said optical system the lateral edges of the portions of the film strip lying over said aperture, means for intermittently stepping said film strip through said gate to expose successive film frames over said aperture while said film strip is stationary, means operatively connected with said intermittent film stepping means for exposing each film frame to said light source twice in immediate succession while laying over said aperture, means for reducing the small deviations of the physically unsupported portion of the film strip laying over said aperture from the plane in which the edges of the film strip are held by said edge guiding means including means for directing a jet of air against the respective sides of the film frame laying stationary in said aperture, the jet directed against the layer of said film having the higher coefficient of expansion being steady, the jet directed against the other side being variable, and valve means operated synchronously with said light interrupting means for varying the pressure of the jet against said other side of said film strip by an amount greater during the first exposure than during the second exposure of each film frame at a rate correlated with the rate of heat absorption by the film causing the buckling during the exposure intervals so that the resultant pressure force on said film frame in said aperture created by said air jets synchronously opposes and substantially neutralizes the buckling force due to the unequal change in expansion of the layers of said film strip due to the different heat absorption rates in a manner to minimize deviations of the central portion of the exposed film frame from the plane of the lateral edges of the film frame.

References Cited in the file of this patent

UNITED STATES PATENTS

| Number | Name | Date |
|---|---|---|
| 1,231,360 | Howell | June 26, 1917 |
| 1,507,360 | Anselmi et al. | Sept. 2, 1924 |
| 1,770,659 | Oehmichen | July 15, 1930 |
| 1,980,600 | Spoor | Nov. 13, 1934 |
| 2,434,193 | Brenkert | Jan. 6, 1948 |

FOREIGN PATENTS

| Number | Country | Date |
|---|---|---|
| 25,724 | Great Britain | of 1909 |
| 27,723 | Great Britain | of 1911 |
| 331,743 | Great Britain | July 10, 1930 |

OTHER REFERENCES

Journal of the Society of Motion Picture Engineers, vol. 53, December 1949, pages 635 through 664.